United States Patent [19]

Ducret

[11] Patent Number: 5,337,479
[45] Date of Patent: Aug. 16, 1994

[54] CABLE AND WIRE STRIPPER

[75] Inventor: Lucien C. Ducret, Old Greenwich, Conn.

[73] Assignee: Seatek Co., Inc., Stamford, Conn.

[21] Appl. No.: 72,850

[22] Filed: Jun. 7, 1993

[51] Int. Cl.⁵ .............................................. H02G 1/12
[52] U.S. Cl. ...................................... 30/90.6; 30/91.1; 30/91.2
[58] Field of Search ................ 30/90.4, 90.6, 90.8, 30/91.1, 91.2, 293, 155; 81/9.41

[56] References Cited

U.S. PATENT DOCUMENTS

| | | |
|---|---|---|
| 2,368,227 | 1/1945 | Lindall .............................. 30/90.8 |
| 2,385,368 | 9/1945 | Montgomery .................... 30/91.1 X |
| 2,388,698 | 11/1945 | Montgomery .................... 30/91.1 X |
| 3,169,315 | 2/1965 | Mankovitz ....................... 30/91.1 X |
| 4,189,799 | 2/1980 | Litehizer, Jr. .................... 30/90.6 X |
| 4,945,636 | 8/1990 | Takizawa ........................... 30/91.2 |
| 5,070,615 | 12/1991 | Michael, III ........................ 30/90.8 |
| 5,093,992 | 3/1992 | Temple, Jr. et al. ................ 30/90.8 |

Primary Examiner—Rinaldi I. Rada
Attorney, Agent, or Firm—Patrick J. Walsh

[57] ABSTRACT

A hand held tool for stripping cable jackets and wire insulation with an adjustable cutting blade applying either longitudinal or ring cuts to the jackets or insulation.

17 Claims, 3 Drawing Sheets

CABLE AND WIRE STRIPPER

BACKGROUND OF THE INVENTION

The present invention relates to hand tools for stripping jackets and insulation from cables and wire.

A variety of cables and wires are commonly used for computer, communications, electronic and electrical installations and generally include outer jackets of flat or round configuration formed of rubber or plastic materials. In a specific case, a plenum cable includes a fire resistant outer jacket or covering made of Teflon and one or more inner insulated conductors.

During the course of installation, it is necessary to cut away the jacket at one or both ends of the cable, and to strip away the insulation from the ends of the conductors in order to make a proper connection of the wire to a terminal and so forth. An electrician's knife or utility knife is the tool most commonly used to remove the tough outer jacket and conductor insulation. Use of a knife for this purpose is a tedious process and poses the risk of personal injury to the operator.

Accordingly, there is need for a cable and wire stripper for removing jackets and insulation in an accurate, safe, quick manner.

SUMMARY OF THE INVENTION

The present invention comprises a cable and wire stripping tool for quickly, easily and safely removing cable jackets and stripping insulation from wire ends. The invention provides a hand held tool with a knife in tip down position for slitting a cable jacket parallel to its long axis. The tool provides for micrometric precision of blade penetration with an adjustable cable follower for guiding the knife over the peaks and valleys of a cable jacket.

In a preferred embodiment, the stripping tool comprises a tool housing formed of upper and lower elongated handles hinged to each other at one end of the tool, with the handles spring biased apart to receive an elongated cable introduced side-wise into a cable receiving groove between the handles. The upper handle includes a surgical quality knife blade fixed to the handle and projecting downwardly into the cable groove for slitting the tenacious outer jacket of a cable workpiece. The upper handle also includes a curved leaf spring nested in the handle for biasing the handles to an open position for receiving a cable. The leaf spring also comprises a cable follower for exposing a preset portion of the knife blade for cutting a cable jacket workpiece.

A thumbscrew projects through the top of the upper handle to engage the tip of the leaf spring for moving the leaf spring with respect to the knife tip so as to adjust the length of knife tip exposed in the cable opening for cutting cable jackets. In a preferred form, the thumbscrew is calibrated to provide micrometric precision of blade penetration so that each turn of the screw exposes a specific length of knife tip thereby enabling the operator to select a knife tip length equal to cable jacket thickness for cutting the jacket without damage to cables or conductors within the jacket.

As noted, the lower handle is pivoted at one end to the upper handle. The lower handle is preferably "J"-shaped with the upright section pivoted to the upper handle by means of a pivot shaft fixed to both handles. A motion limiting shaft is fixed to the lower handle and passes through an arcuate slot in the upper handle to limit pivoting movement of the handles to a range determined by the slot contour. The other end of she leaf spring engages the motion limiting pin for the purpose of biasing the handles to an open position for receiving a workpiece cable.

The tool of preferred configuration when in use lies along the palm of one hand with the thumb overlying the upper handle and with the fingers encompassing the lower handle. In this position a cable may be easily inserted side-wise into the cable groove for slitting the jacket longitudinally of the cable as desired. The arrangement of handles and leaf spring covering of the blade comprise a safe design for the tool substantially minimizing any inadvertent physical injury in normal operation.

The tool may also provide a "ring cut" of cable jacket or wire insulation, that is, a cut transversely of the cable wire for removing a section of jacket or insulation. For this purpose a transverse opening in the lower handle adjacent the cutting knife accommodates a section of insulated cable or wire. The operator selects a correct length of knife tip, inserts the wire into the opening as desired and performs a circumferential or "ring cut" of the insulation.

In another aspect of the invention, the overlapping sidewall portions of the upper and lower handles are provided with a wire stripper comprising cooperating cutting edges for stripping insulation from the tip of a wire. In preferred form a diamond shaped cutting opening is provided in the lower handle wall. A "V" notched cutting blade is secured to the adjacent edge of the upper handle in registry with the diamond opening. After inserting an insulated wire into the opening, the operator closes the upper handle and "V" notch cutting edge over the cutting opening thereby cutting into the insulation and stripping it from the wire. The leaf spring loading of the handles enables the operator to control and "feel" the cutting action to avoid cutting beyond the insulation into the wire.

In still another aspect of the invention, the lower handle is provided with a foldaway knife blade for trimming the filler or stuffing surrounding conductors positioned within a cable jacket.

Modifications to the invention are provided for accommodating different sizes and shapes of cables and wires.

OBJECTS OF THE INVENTION

An important object of the invention is to provide a hand held tool for stripping Teflon covered plenum type fire resistent cables as well as communications and electrical cords with a minimum of physical effort.

It is an object of the invention to provide a tool for stripping cable and wire with a cutting blade being adjustable according to the thickness of cable jacket or wire insulation being cut.

It is a further object of the invention to provide a tool for providing a longitudinal cut or "ring cut" in a cable covering jacket.

It is a further object of the invention to provide a tool for stripping cable and wire with a spring member for biasing handle portions of the tool and for controlling the length of exposed knife tip for cutting cable jackets.

It is a further object of the invention to provide a movable leaf spring for covering the cutting blade and exposing a cutting tip of the blade with the leaf spring being curved for minimum flexion at the blade tip so that the leaf spring follows the contours of a workpiece cable jacket thereby assuring correct penetration of the cutting tip into the jacket.

It is a further object of the invention to provide a hand held stripping tool which is safe to use.

It is a further object of the invention to provide a stripping tool which is compact, lightweight and simple to operate and which follows the irregularities of the outside feature of the cable's jacket.

It is another object of the invention to provide a stripping tool with built-in safety features such as blade enclosure to prevent physical injury and depth-of-cut control prevent damage to inner conductors.

It is another object of the invention to provide modifications to the invention for handling different sizes of cable and wire.

Other and further objects of the invention will occur to one skilled in the art with an understanding of the following detailed description of the invention or upon employment of the invention in practice.

DESCRIPTION OF THE DRAWING

A preferred embodiment of the invention has been chosen for purposes of illustrating the construction and operation of the invention and is shown in the accompanying drawing in which.

DETAILED DESCRIPTION OF THE INVENTION

Figure 1:
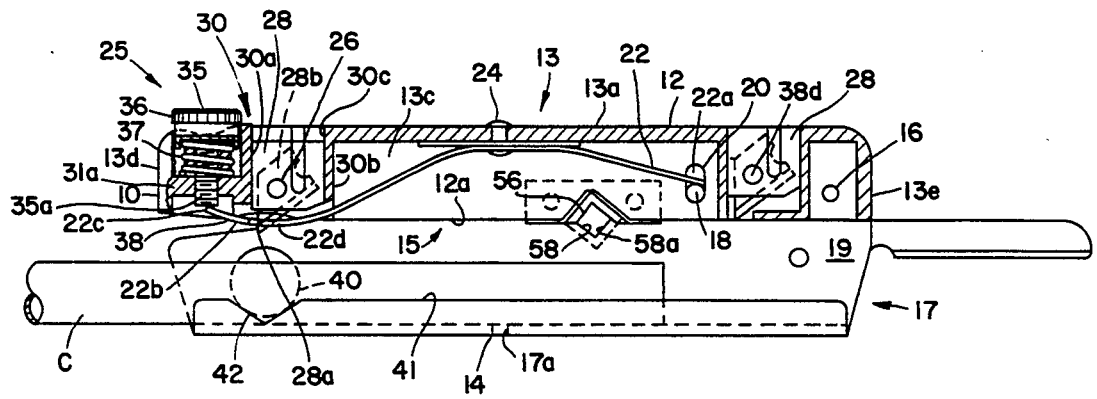
FIG. 1 is a front side elevation of a preferred embodiment of the tool with the upper handle member in section for illustrating internal components.

Referring to the drawing, the cable and wire stripping tool 10 comprises an upper stripping head handle member 12, and a lower cable receiving handle member 14. The upper handle member includes an elongated shell 13 with a top panel 13a and depending front 13b and rear 13c side walls and left 13d and right 13e end walls defining a downwardly open cavity 15 for receiving operating components of the tool. The lower handle member includes a "U" shaped bottom wall or channel 17 for receiving a cable C and an integral upstanding rear wall 19 assembled in overlapping relation to the depending rear wall 13c of the upper handle. The upper edge 19a of the rear wall slopes from right to left of the tool so that when the handles are operated as described below in detail, the upper edge 19a remains below the level of the top panel 13a.

The upper and lower handles are affixed to each other by means of a pivot pin 16 passing through one end of both handles and by means of a motion limiting pin 18. The pivot pin passes through a rear portion of lower handle rear wall 19 and through upper handle front 13b and rear 13c side walls firmly affixing the handles together for pivotal movement about the pin axis x - x'. The motion limiting pin 18 is also affixed to the lower handle rear wall ahead of the pivot pin and passes through aligned slots 20 in the depending front and rear side walls of the upper handle thereby limiting pivoting movement of the handles with respect to each other.

Figure 2:
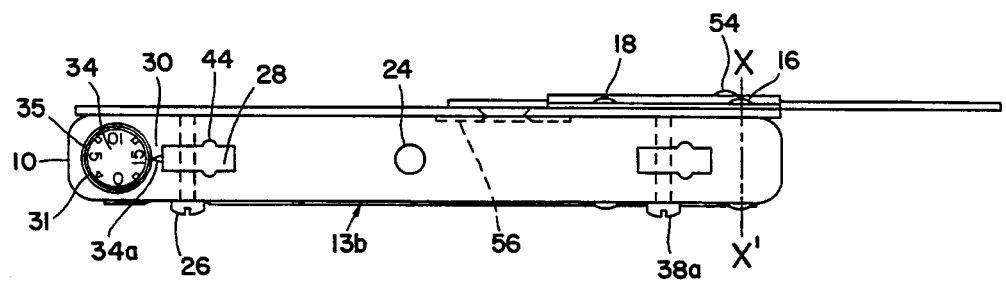
FIG. 2 is a top plan view of the tool of FIG. 1.
Figure 3:
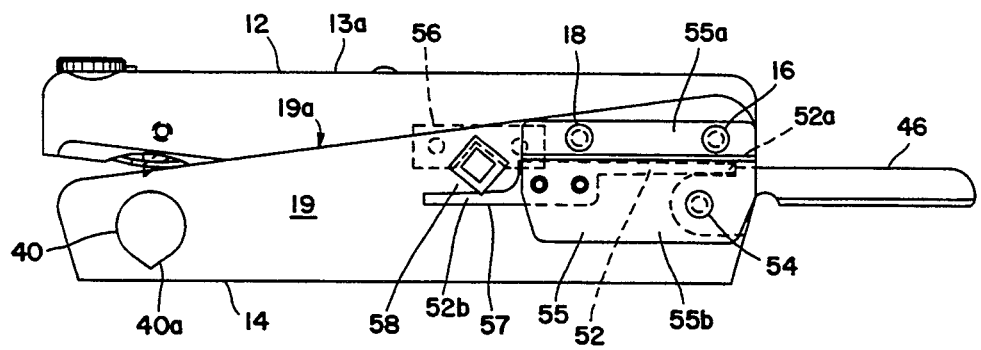
FIG. 3 is a rear side elevation of the tool viewed from the back of FIG. 1.

A "S" shaped leaf spring 22 is located in upper handle cavity 15 and secured therein by a rivet 24 through the top panel 13a. The right end 22a of the spring engages the upper surface of the motion limiting pin 18 thereby urging the lower handle counterclockwise into the position shown in FIG. 2. The leaf spring extends to the left from its rivet connection and includes a curved section 22b circumventing a blade cartridge 28 and terminating at its left end 22c in engagement with an adjusting thumbscrew 25. The curved section 22b of the leaf spring includes a longitudinally extending slot 22d in the vicinity of the blade cartridge for exposing a cutting tip 28a of the blade 28b.

The blade cartridge 28 comprises front 28c and rear 28d plates joined together and having an interior cavity 28e for receiving and securing the cutting blade 28b in place. The triangular cutting tip 28a extends from the lower edge of the cartridge. A blade compartment 30 defined by interior walls 30a, 30b, and opening 30c in the top panel 13a receives and positions the blade cartridge in the tool. The surfaces of the blade cartridge front and rear plates include keys 28f for engaging corresponding grooves 30d in the compartment opening 30c to assure proper orientation of the cutting tip when an operator fits a blade cartridge into the tool. A retaining bolt 26 passes through the front side wall, through a passage 28g in the cartridge, and is threaded into the rear side wall for holding the blade securely in fixed position in the tool.

The thumbscrew 25 fitted to the left end of the upper handle engages the tip 22c of the leaf spring for moving the spring vertically with respect to the tip 28a of the blade thereby exposing a greater or lesser portion of the tip for cutting through a cable jacket. A thumb screw recess 31 in the upper handle is defined by left end wall 13d, inner transverse 31a and vertical 31b walls, and an opening 31c through the top panel. The thumbscrew includes a cap 35 with indicating dial 34 and serrated skirt 36 and threaded bolt 35a for threaded engagement with inner transverse wall 31a. A conical friction 37 spring keeps the setting of the thumb screw. It will be understood that by adjusting the thumb screw upward or downward, the tip of the leaf spring also moves upward or downward exposing more or less respectively of the blade tip through the slot 22d in the leaf spring for penetration into the jacket of a cable.

Preferably, the rotary movement of the thumb screw and leaf spring are coordinated as linear so that each rotation of the screw exposes a fixed length of blade tip. In one form of the invention, each rotation of the screw exposes (or covers) 0.020" of blade tip. The dial 34 shows the penetration of the knife blade into cable C indicated at pointer 34a.

Figure 4:
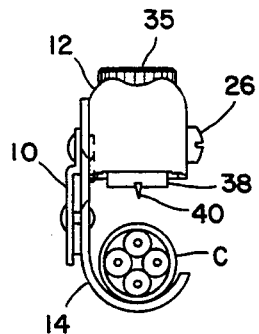
FIG. 4 is an elevational view of the tool from the left end of FIG. 1 showing a cable in position for a longitudinal cut of the cable jacket.
Figure 5:
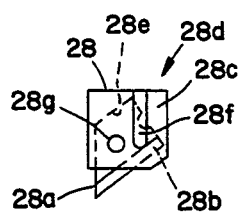
FIG. 5 is a detailed view of a blade cartridge for the tool.

An important aspect of the invention is the cooperation of leaf spring and blade tip in engaging and cutting a cable jacket. Cable jackets ordinarily encase a multitude of individual conductors such that the cable jacket surface undulates throughout its length. The curvature of the leaf spring in the vicinity of the cutting blade enables the tool to follow the undulating surface contour of the jacket while maintaining the length of blade tip at its desired setting for precisely cutting the jacket without harming interior conductors and without undercutting the jacket. This advantage follows from the minimum flexion of the spring owing to its fixture within the cavity and its curvature in the vicinity of the blade tip. By squeezing the tool handles together, the blade tip first contacts the outer portion of the cable jacket then the blade penetrates the jacket until the curved portion of the leaf spring stops penetration of the blade which has been preset with the depth of cut control thumbscrew. The complete tool is then simply pulled along the cable and by maintaining the squeezing action, blade penetration of the cable jacket is kept constant despite cable surface irregularities or undulations. The curved portion of the leaf spring in all cases contacts the cable's outer jacket slightly to the left of the blade as viewed in FIGS. 1 and 4. This insures greater rigidity of the curved spring since the contact area of spring to cable is closer to the tip of the thumbscrew. Accordingly, this feature of the invention gives better precision of depth of cut because deflection of the spring is minimal.

A spare blade cartridge 28 is carried in a storage compartment 38 located in the upper handle in the space between pivot and motion limiting pins. A bolt 38a passing through the cartridge and the side walls of the upper handle member secures the spare cartridge in place.

Figure 6:
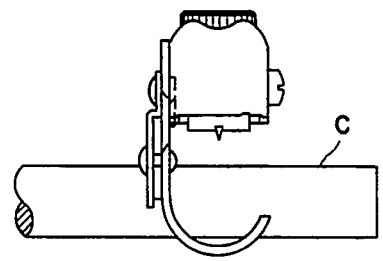
FIG. 6 is an elevational view of the tool from the left side of FIG. 1 showing a cable in position for a ring cut of the cable jacket.

The tool includes a circular opening 40 and "V" notch 40a in the rear wall 19 of the lower handle in the vicinity of the cutting blade for performing a "ring cut" on a cable jacket as shown in FIG. 6. The opposite lip of the lower handle has a "V" notch 42 aligned with the circular opening and "V" notch 40a so that a cable C may be inserted across the cutting zone for performing a ring cut at any desired location along the cable.

The tool includes means for stripping insulation from the end of an insulated conductor. A diamond shaped opening or window 58 with beveled perimeter cutting edges 58a is located in the upstanding side wall of the lower handle in registry with an inverted "V" notched beveled cutting blade 56 secured to the lower edge 12a of the upper handle. As shown in FIG. 1, the assembly of diamond opening and "V" notched cutting blade provides for a normally fully open cutting window for receiving the end of an insulated conductor. The diamond opening accepts the most common sizes of wire to be stripped. By pressing the handles together, the "V" notch closes the window moving into cutting engagement with the wire insulation. The insulation is simultaneously cut by the beveled edges 56a of the "V" notch and the beveled cutting edges of the diamond opening 58a. The spring loading of the handles enables the operator to better control movement of the cutting edges and to "feel" the cutting action of the blades on the insulation.

The tool is provided with a foldaway knife blade 46 on the rear face of the lower handle. The foldaway blade is fitted by a pivot pin 54 for movement between open and closed positions beneath a protective shield 55. The protective shield includes an upper section 55a riveted to the handle, preferably by pivot pin 16 and motion limiting pin 18, and an offset depending skirt portion 55b for protecting the foldaway blade. A double-ended leaf spring 52 is secured under the skirt and includes a right spring arm 52a for maintaining the blade firmly in open position, and a left arm 52b for confronting and protecting the blade cutting edge in stored position.

Figure 7:
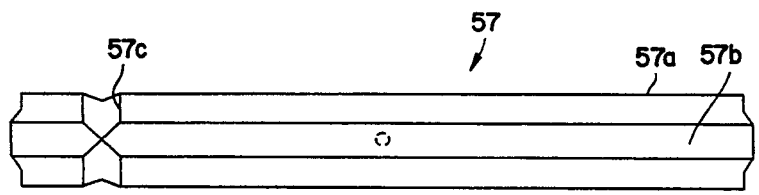
FIG. 7 is a top plan view of a reducer insert for nesting in the lower handle of the tool of FIG. 1.
Figure 9:
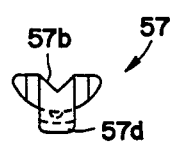
FIG. 9 is an end view of the reducer of FIG. 8.
Figure 8:
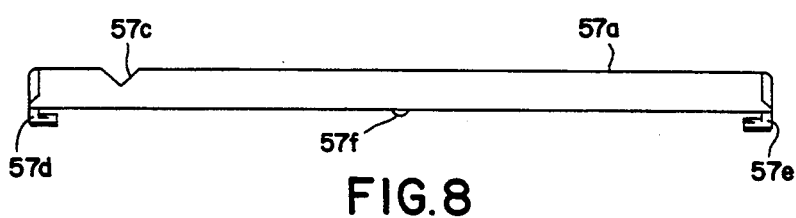
FIG. 8 is a side elevational view of the reducer of FIG. 7.

FIGS. 7, 8 and 9 illustrate a tool accessory in the form of a reducer 57 for accommodating smaller cables and wires. The accessory comprises an elongated bar 57a fitted into the cable receiving channel 17 of the lower handle member. The reducer accessory includes an elongated groove 57b for receiving a smaller cable or wire for a longitudinal cut, and a transverse groove 57c for a ring cut to a cable. Each end of the accessory has depending and inturned clips 57d-e for assembling the accessory to opposite ends of the channel 17. An embossment 57f projects from the bottom of the accessory bar and registers with a detent 17a in the channel for maintaining the reducer in position.

A modification to the invention is shown in FIGS. 10-16 of the drawing and comprises a removable cable guide wheel 64 for accommodation different shapes of cable such as flat cables of various sizes. The lower handle includes a bail 62 having vertical 62a and transverse 62b members for receiving and positioning the guide wheel. A central mounting shaft 74 fits the wheel to the bail for rotation and placement of a selected recess in cutting position beneath the cutting blade. The guide wheel has a variety of recesses 66 in its periphery for receiving different shaped cables including a "V" recess 66a, a flat recess 66b, a curved recess 66c, and a transverse notch recess 66d. The left face of the wheel (FIG. 11) has a circular channel 69 with position holes 68a-d aligned with each of the surface recesses 66a-d. A position pin 63 affixed to the bail engages a position hole 68a-d to select one of the surface recesses for receiving a workpiece cable for cutting. A compression spring 65 held captive in axial recess 72 about mounting shaft 74 urges the wheel forward (i.e., to the left of FIG. 11) into firm engagement with the position pin.

The guide wheel is positioned by pressing the wheel against the spring force to disengage the position pin, and rotating the wheel as desired to locate the desired recess in the cutting zone. The guide wheel may also be removed and replaced by another wheel in this manner.

If desired, the guide wheel may also include a stop pin 73 on its rear face to prevent backward movement and disengagement of the wheel from position pin while performing a cable cut.

Figure 10:
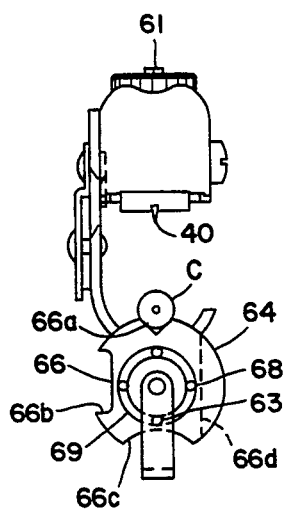
FIG. 10 is a left end elevation of a modified form of the tool illustrating a turret wheel or movable cable guide for accepting different sizes and shapes of cables.
Figure 11:
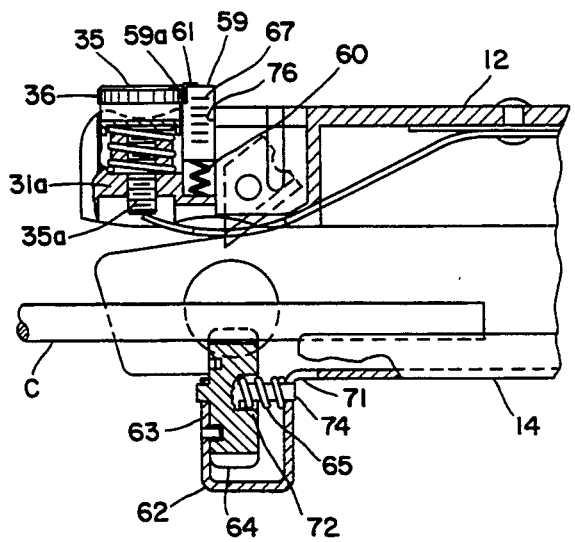
FIG. 11 is a fragmentary, front side elevation view partially in section of the tool of FIG. 10 showing the turret wheel and a thumbscrew turn indicator.

The guide wheel recesses accommodate different cable shapes and positions for executing longitudinal and transverse slits on a cable jacket. FIGS. 10 and 11 illustrates a cable or wire placed in "V" recess 66a for a longitudinal cut by the blade tip. The flat recess 66b and the curved recess 66c accommodate cable or wire workpieces conforming to these recess shapes. The flat recess can be radially offset from the axis of the guide wheel to slit a flat cable jacket between conductors. If desired, a workpiece may be slit on one side of its jacket or insulation then flipped over for performing a slit on the opposite side of the workpiece. The transverse notch recess 66d receives a cable or wire workpiece extending across the cutting zone through opening 40 for application of a ring cut by the cutting blade.

Figure 12:
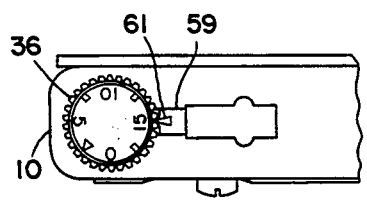
FIG. 12 is a fragmentary top plan view of the tool of FIG. 10.
Figure 13:
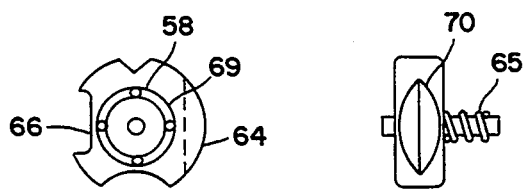
FIG. 13 is a front elevational view of the movable cable guide wheel of the modified tool of FIG. 10.
Figure 14:
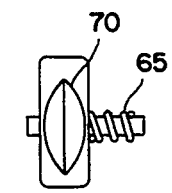
FIG. 14 is a side elevation of the movable cable guide wheel as seen from the right of FIG. 13.
Figure 15:
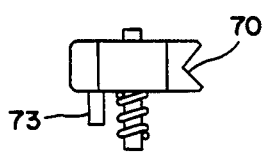
FIG. 15 is a bottom plan view of the movable cable guide wheel as seen from beneath FIG. 13.
Figure 16:
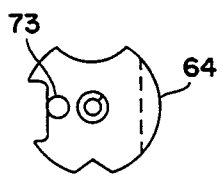
FIG. 16 is a rear view of the movable cable guide wheel of the modified tool of FIG. 10.

A further modification of the invention is shown in FIGS. 11 and 12 and comprises a thumbscrew lock and position indicator. The lock is in the form of a rectangular block 59 fitted into a recess 76 in the upper handle between the knife compartment and the thumbscrew. The lock body is spring loaded upwardly bringing lock shoulder 59a into engagement with the thumbscrew cap 35. The lock shoulder is provided with serrations matching those 36 of the cap to prevent rotation of the cap when cap and lock are engaged as shown in FIG. 11. The length of cutting blade tip is selected by depressing the lock out of engagement with the cap, rotating the thumbscrew cap for more or less cutting tip, and releasing the lock. The gradations 67 on the lock body provide an index of the extent of cutting tip exposure. A pointer 61 cooperates with the dial of the cap to indicate depth of cut of the blade tip.

By way of summary, the cable and wire stripping tool of the invention comprises upper and lower elongate handle members comfortably received in the palm of a hand, with the handle members affixed to each other by a pivot pin at one end of the members and by a motion limiting pin located in spaced parallel relationship and inboard of the pivot pin for limiting relative movement to the contour of a slot occupied by the motion limiting pin. The lower member includes an elongate U shaped channel for sideways reception of a workpiece cable. The upper handle member at its end opposite the pivot axis is fitted a cutting blade and with a fixed leaf spring extending along the length thereof from the motion limiting pin to an adjusting thumbscrew. The leaf spring is S shaped and circumvents the cutting blade which projects through a slot in the spring. The depth of blade cut is selected by adjusting the thumbscrew to move the leaf spring relative to the blade tip so that more or less blade tip projects through the slot. When engaging a cable jacket, the leaf spring initially engages the jacket, and as the tool handles are squeezed together the blade tip projects through the slot and penetrates the jacket to the extent preset by the thumbscrew. The area of leaf spring between the cutting tip and the thumbscrew exhibits minimum flexion and remains in engagement with the jacket surface as the tool is drawn over the hills and valleys of the jacket surface so that the same depth of blade tip penetrates and slits the jacket without damage the interior cable components. The depth of cut control provided by cooperation of leaf spring is available for ring cuts as well as for making cable jacket cuts with the guide wheel of FIGS. 10-16 of the drawing.

I claim:

1. A cable and wire stripper comprising first and second elongate handle members affixed to each other for limited pivotal movement, the second handle member having an elongate U shaped channel for sideways reception of a jacket covered cable, the first handle member having a cutting blade projecting into the channel for stripping the jacket of a cable positioned in the channel, means for urging the first and second handle members to a normally open position for receiving a cable in the channel, a blade guide affixed to the first handle member and extending over the blade, an opening in the blade guide through which the cutting blade extends into the cable receiving channel, means for moving the blade guide to determine the length of blade tip projecting beyond the guide into the channel, the blade guide being supported by the first handle member for minimum flexion at the blade location so that the guide engages a cable jacket surface while maintaining a precise depth of cut of the blade into the jacket for slitting the jacket without harm to interior cable components.

2. A cable and wire stripper comprising first and second handle members, the first handle member being an elongate shell defined by a top panel, depending side and end walls, and having an open underside providing access into a cavity within the shell, the second handle member having an elongate bottom portion defining a cable receiving channel, the elongate bottom portion being integral with an upstanding side wall, the first and second handle members being affixed to each other for limited pivotal movement about an axis located at one end of the stripper, a cutting blade fitted to the other end of the first handle member and projecting into the channel for stripping the jacket of a cable positioned in the channel, a spring member affixed to the first handle member for urging the first and second handle members to a normally open position for receiving a cable in the channel, the spring member extending over the blade, an opening in the spring member through which the cutting blade extends into the cable receiving channel, means for adjusting the position of the blade guide to select a length of blade tip projecting beyond the opening into the channel, the spring member being supported by the first handle member for minimum flexion at the blade location so that the spring member engages a cable jacket surface while maintaining a precise depth of cut of the blade into the jacket for slitting the jacket without harm to interior cable components.

3. A cable and wire stripper for cutting a cable jacket having an undulating surface contour comprising first and second handle members, the first handle member being an elongate shell defined by a top panel, depending front and rear side and left and right end walls, and having an open underside providing access into a cavity within the shell, the second handle member having an elongate bottom portion defining a cable receiving channel, the elongate bottom portion being integral with an upstanding side wall, the first and second handle members being affixed to each other at the rear side wall and the upstanding side wall respectively for pivotal movement about an axis located at one end of the stripper, a motion limiting pin affixed to the upstanding side wall of the second handle member and extending through arcuate slots in the front and rear side walls of the first handle member for restricting pivotal movement of the handle members to a fixed range, a cutting blade fitted into the cavity at the other end of the first handle member opposite the pivot axis and projecting into the channel for stripping the jacket of a cable positioned in the channel, an elongate spring member located in the cavity and affixed to the top panel of the first handle member, the spring member having one end engaging the motion limiting pin for urging the first and second handle members to a normally open position for receiving a cable in the channel, the spring member having a curved section extending over the blade and having another end terminating at the other end of the first handle member, a slot in the spring member through which the cutting blade extends into the cable receiving channel, means for moving the other end of the spring member for selecting the length of blade tip projecting beyond the guide into the channel, the said curved section of the spring member having minimum flexion at the blade location so that the spring member engages and follows the undulating surface contour of a cable jacket while maintaining a precise depth of cut of the blade into the jacket for slitting the jacket without harm to interior cable components.

4. A cable and wire stripper as defined in claim 3 in which the means for moving the other end of the spring member comprises a thumbscrew located at the other end of the first handle member for engaging the other end of the spring member.

5. A cable and wire stripper as defined in claim 4 in which the thumbscrew includes a cap and dial to indicate depth of cut of the blade for cutting a cable jacket.

6. A cable and wire stripper as defined in claim 4 in which the thumbscrew includes a serrated cap, and which further includes a calibrated lock member spring loaded into the cavity for normally engaging the serrations for locking the cap against rotary movement and having means for indicating the depth of cut applied to the cutting blade by the thumbscrew.

7. A cable and wire stripper as defined in claim 3 in which the first handle member includes a blade compartment within the cavity, and a removable blade cartridge secured to the compartment with the blade tip projecting into the channel.

8. A cable and wire stripper as defined in claim 7 in which the cavity includes a storage compartment for receiving a spare blade cartridge.

9. A cable and wire stripper as defined in claim 3 in which the elongate bottom portion of the second handle member is U shaped.

10. A cable and wire stripper as defined in claim 9 in which the upstanding side wall of the second handle member includes an opening therethrough with a first "V" notch formed in the perimeter of said opening, and a second "V" notch in the opposite lip of the second handle being aligned with the first "V" notch for receiving a cable transversely for performing a ring cut on the cable jacket.

11. A cable and wire stripper as defined in claim 3 in which the first handle member includes a "V" notch cutting blade at the edge of the rear side wall, and the second handle member includes an opening with sharp beveled edges in the upstanding side wall in registry with the "V" notch for stripping insulation from the ends of insulated wire.

12. A cable and wire stripper as defined in claim 3 which includes a knife blade pivoted to the upstanding side wall of the second handle member, a shield for covering the blade, and a double ended leaf spring for maintaining the blade in deployed position and for protecting the cutting edge of the blade in stored position.

13. A cable and wire stripper as defined in claim 3 having a reducer positioned in the channel for receiving smaller wires and cables, a longitudinal channel and a transverse channel in the reducer.

14. A cable and wire stripper as defined in claim 3 in which the cable receiving channel has a long axis the cable receiving channel adjacent the cutting blade is fitted with a bail, a movable turret wheel affixed to the bail on a shaft parallel to the long axis of the channel, the turret wheel having a plurality of cable receiving recesses rotatable into cooperating relationship with the cutting blade, and the recesses being of different shapes to accommodate various cable shapes.

15. A cable and wire stripper as defined in claim 14 in which at least one recess is oriented transversely of the cable receiving channel for accommodating a cable for applying a ring cut thereto.

16. A cable and wire stripper as defined in claim 14 in which the turret wheel is provided with stop means to limit axial movement of the wheel when applying a ring cut to a cable jacket.

17. A cable and wire stripper as defined in claim 14 in which the turret wheel is spring loaded into position on the bail.

* * * * *